United States Patent Office 3,465,786
Patented Sept. 9, 1969

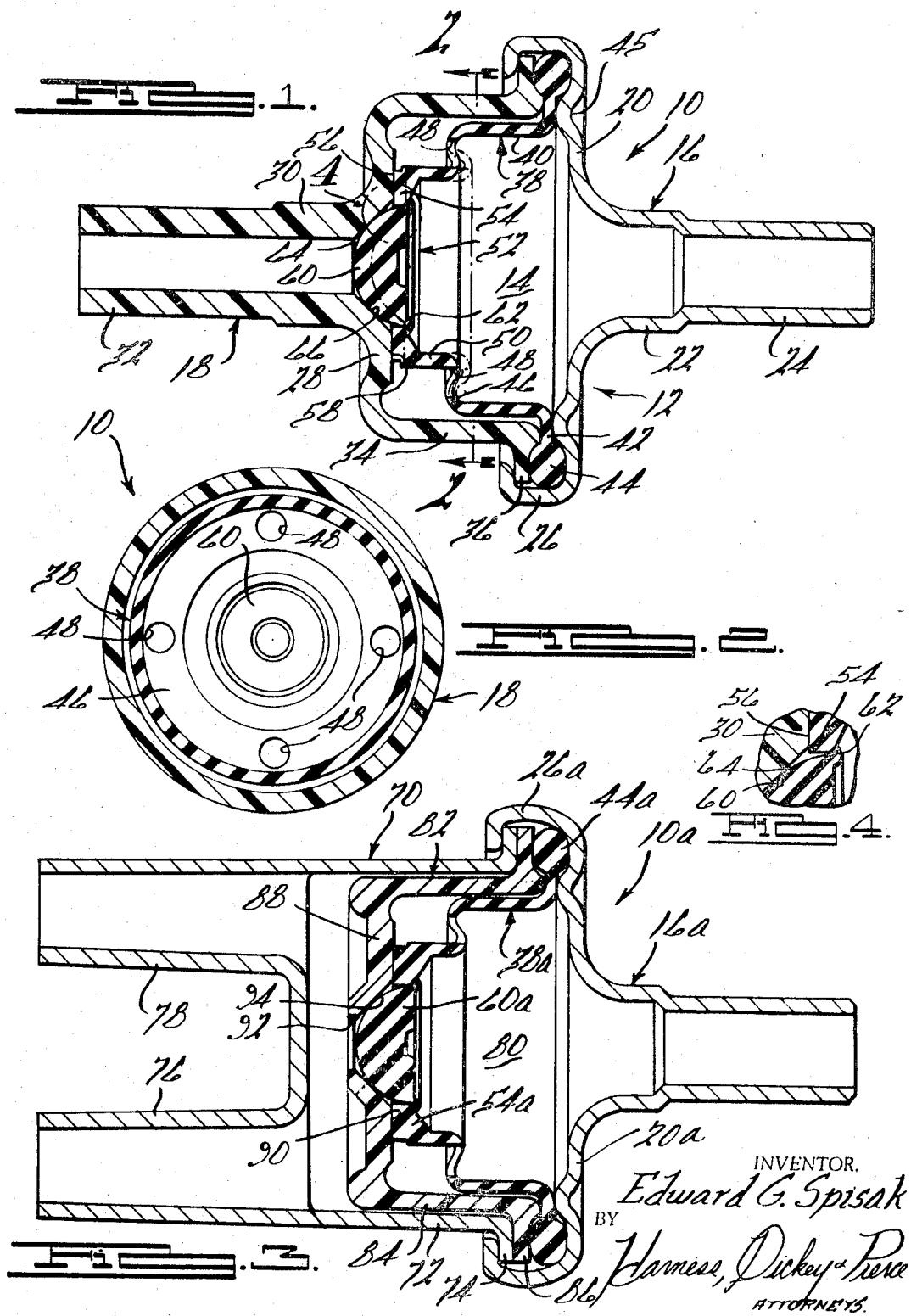

---

3,465,786
VACUUM CHECK VALVE
Edward G. Spisak, Wayne, Mich., assignor to Gar Wood Industries, Inc., Ypsilanti, Mich., a corporation of Michigan
Filed Sept. 8, 1966, Ser. No. 583,145
Int. Cl. F16k 15/00, 17/00, 21/04
U.S. Cl. 137—516.27     5 Claims

ABSTRACT OF THE DISCLOSURE

In a vacuum check valve mechanism, a housing defining a valve chamber and first and second passage means communicable with the chamber, means defining first and second valve seats in the chamber, and a valve member disposed in the chamber between the passages, the valve member comprising a perforate section, a valve section having first and second valve portions and means providing for relative movement of the valve portions toward and away from engagement with the valve seats, the valve portions being movable in one direction in response to the vacuum level in the first passage exceeding the vacuum level in the second passage to a position out of sealing engagement with the valve seats, whereby the first and second passages are communicable through the chamber and the perforate section of the diaphragm means, the valve portion being movable in another direction in response to the vacuum level in the second passage exceeding the vacuum level in the first passage to a position sealingly engaging the valve seats, whereby to block communication between the first and second passages.

---

This invention relates generally to the valve art and, more particularly, to a new and improved vacuum check valve.

The continuously increasing use of vacuum operated auxiliary power system in automotive vehicles has prompted development of a wide variety of different types of vacuum systems which operate from sources of vacuum power such as the intake manifolds of the vehicles. By way of example, such systems are used for operating servo devices for locking and unlocking rear deck lids, remotely located controls for heater systems and fluid pressure motors for windshield wiper and washer systems.

Auxiliary power systems of the above character usually comprise vacuum reservoirs which assure proper functioning of the vacuum operated devices during periods of vacuum fluctuation, and which also make it possible to operate some of the servos when the vehicle engines are not operating. In order to selectively seal the vacuum reservoirs during periods of low manifold vacuum, a multiplicity of different types of valve mechanisms have been developed; however, such valve devices heretofore known and used have been relatively expensive and have resulted in complex assembly and operating problems. Moreover, they have provided excessive resistance to differential pressure changes, resulting in undesirable pressure drop during certain operating conditions. Prior art valve devices of the above type have also frequently used complex seating spring arrangements that have not always provided the desired sealing characteristics.

It is accordingly a general object of the present invention to provide a new and improved vacuum check valve mechanism which overcomes the disadvantages of similar type valves heretofore known and used.

It is another object of the present invention to provide a new and improved vacuum check valve of the above character which is of a simple design, is easy to assemble and economical to commercially manufacture.

It is still another object of the present invention to provide a new and improved vacuum check valve which exhibits improved sealing characteristics and is stable in operation under extreme temperature conditions.

It is another object of the present invention to provide a check valve of the above character which is provided with valve means that is selectively movable to and from a seated position without the use of any auxiliary spring arrangements or the like.

It is another object of the present invention to provide a vacuum check valve which is extremely sensitive to differential pressure changes.

It is yet another object of the present invention to provide a valve mechanism of the above type wherein the valve member thereof has considerably more sealing area than similar type valves heretofore known and used.

It is a further object of the present invention to provide a new and improved check valve mechanism of the above character which may be provided with a plurality of inlets and/or outlets to accommodate various vacuum systems.

Other objects and advantages of the present invention will become apparent from the following detailed description, taken in conjunction with the accompanying drawing, wherein:

FIGURE 1 is a longitudinal cross-sectional view of a vacuum check valve in accordance with an exemplary embodiment of the present invention;

FIGURE 2 is a transverse cross-sectional view of the check valve illustrated in FIGURE 1, as taken substantially along the line 2—2 thereof;

FIGURE 3 is a longitudinal cross-sectional view of an alternate embodiment of the vacuum check valve of the present invention; and FIGURE 4 is an enlarged fragmentary view of the portion of the valve structure illustrated within the circle 4 of FIGURE 1.

For convenience of description, the terms "upstream," "downstream," and words of similar import will have reference to the vacuum check valve of the present invention illustrated in FIGURE 1, with the upstream end of the valve being located at the right side of this figure. Likewise, the term "inner," "outer," and derivatives thereof will have reference to the geometric center of the valve mechanism of the present invention and the various component parts thereof.

Briefly, the vacuum check valve of the present invention is adapted to be operatively associated with a vacuum source and a vacuum reservoir which are communicable with the upstream and downstream ends, respectively, of the valve mechanism. The subject valve includes a diaphragm member which comprises an outer peripheral section adapted to be compressingly engaged between the upstream and downstream sections of the valve housing, thereby providing sealing gasket means between said housing sections. The diaphragm member also includes a central valve section consisting of a pair of sequentially seating portions which are movable to and from positions sealingly engaging a pair of valve seats defined by the downstream section of the valve housing, a plurality of perforations or ports being provided interjacent the valve section and the outer peripheral section of the diaphgram member to communicate the upstream and downstream ends of the valve housing when the aforesaid valve portions are unseated. At such time as the vacuum level in the reservoir is greater than the vacuum level of the source, the valve section of the diaphragm will become remain positively engaged with the valve seats whereby to seal the upstream section of the valve from the downstream section thereof. However, when the vacuum level in the reservoir is less than the vacuum level of the source, the valve section of the diaphragm will become disengaged from the valve seats and move toward the upstream section of the valve mechanism, whereby to communicate the upstream section with the downstream section and hence the vacuum source with the reservoir.

Referring now in detail to FIGURE 1 of the drawing, a vacuum check valve mechanism 10, in accordance with an exemplary embodiment of the present invention, is shown as comprising a valve housing 12 defining a central chamber 14. The housing 12 consists of an upstream member 16 and a downstream member 18, the former of which comprises a radially extending section 20 that terminates at its radially innermost portion in a longitudinally extending tubular section 22 having a reduced diameter nipple portion 24 adapted to have a suitable conduit (not shown) received thereon to communicate the housing 12 with a suitable vacuum source, such as a vehicle intake manifold. The radially outer edge of the housing section 20 terminates in a longitudinally extending portion 26 which is adapted to cooperate with the downstream member 18 of the housing 12 in a manner later to be described for fixedly securing the members 16 and 18 together. The housing member 16 is preferably fabricated of stamped metal which may be plated, for example, with zinc or the like, for preventing corrosion.

The downstream member 18 of the housing 12 is preferably fabricated of a plastic material such as Celcon, nylon or other suitable material exhibiting dimensional stability under relatively extreme temperature conditions. Such a material is desirable because it can be easily molded, and also because it provides sealing surfaces which are as good if not better than metal which would be of comparable cost, but would require tedious and costly machining operations. The housing member 18 comprises a radially outwardly extending section 28 which terminates at its radially innermost portion in a longitudinally extending tubular section 30 having a reduced diameter nipple portion 32 adapted to receive a suitable conduit (not shown) thereon to communicate the housing 12 with an associated vacuum reservoir. The radially outermost portion of the housing section 28 terminates at a longitudinally extending section 34 which is formed with a radially outwardly projecting shoulder portion 36 at the upstream end thereof. As seen in FIGURE 1, the downstream end of the housing portion 26 is adapted to be crimped or similarly formed radially inwardly over the downstream side of the shoulder portion 36 to fixedly secure the housing members 16 and 18 together.

Disposed within the chamber 14 is a resilient diaphragm member, generally designated 38, which is preferably fabricated of corrosion resistant silicone rubber of approximately 40–45 durometer. The member 38 comprises a longitudinally extending medial section 40 which is spaced slightly radially inwardly from the inner periphery of the housing section 34 and terminates at the upstream end thereof in a radially outwardly extending portion 42 that is formed with an annular, enlarged thickness bead or O-ring portion 44. It will be seen that the portion 44 is compressed between the housing section 20 and the shoulder 36 upon assembly of the housing members 16 and 18, whereby to assure that a fluid-tight seal is provided around the housing 12. An annular recess 45 may be formed around the housing section 20 to assure that diaphragm portion 42 is tightly engaged with the upstream end of the housing section 34. The downstream end of the diaphragm section 40 terminates at a radially inwardly extending section 46 which is of relatively thin cross-section and is formed with a plurality of ports or perforations, best illustrated in FIGURE 2 and generally designated by the numeral 48. The diaphragm section 46 is adapted to act as a hinge means permitting selective movement of a valve section 52 of the diaphragm member 38, as will later be described.

The radially innermost portion of the valve section 46 terminates at a longitudinally extending section 50 which in turn terminates at its downstream end at the valve section 52 of the diaphragm member 38. As best illustrated in FIGURE 1, the valve section 52 comprises a first valve portion 54 which is disposed at the downstream end of the diaphragm section 50 and extends radially inwardly therefrom. The valve portion 54 defines a flat, radially extending sealing surface 56 which is adapted to abut against a flat radially extending valve seat 58 defined around the upstream side of the housing section 28. The valve section 52 comprises a second valve portion 60 which is substantially hemispherical in cross-section (see FIGURE 1) and is located radially inwardly with respect to the valve portion 54. The valve portions 54 and 60 are movably connected to one another by means of a reduced thickness diaphragm portion 62 (see FIGURE 4) which extends radially therebetween, the portion 62 serving as a hinge means for permitting relative longitudinal movement between the valve portions 54 and 60, as will later be described. The valve portion 60 defines a hemispherical sealing surface 64 which is adapted to abut against and sealingly engage a frusto conical valve seat 66 which is formed in the housing member 18 interjacent the valve seat 58 and the interior of the housing section 30. As will hereinafter be described in detail, the valve portions 54 and 60 are adapted to sequentially engage the valve seats 58 and 66, respectively, to selectively block communication between the upstream and downstream ends of the valve mechanism 10.

Referring now to FIGURE 3, in a slightly modified embodiment of the present invention, a check valve mechanism 10a is shown as comprising an upstream housing member 16a and a diaphragm member 38a, both of which members, along with other components hereinafter to be described, are identical to the parts of the valve mechanism 10 designated by like numerals in FIGURE 1. The valve 10a is provided with a downstream housing member 70 which comprises a cylindrical section 72 that terminates at its upstream end in a radially outwardly extending portion 74 adapted to have the portion 26a of the member 16a crimped or similarly formed radially inwardly over the downstream side thereof to fixedly secure the housing members 16a and 70 together. The member 70 is formed with a pair of longitudinally extending tubular sections 76 and 78, each of which is adapted to have a suitable conduit (not shown) received thereon in the same manner as the housing section 30 of the valve mechanism 10. Accordingly, the downstream end of the valve mechanism 10a is adapted to communicate with two different vacuum reservoirs, with one reservoir and one vacuum operated servo or the like, or with two different vacuum operated devices.

The housing members 16a and 70 define a central chamber 80 within which the diaphragm member 38a and a valve seat member 82 are located. The member 82 comprises a longitudinally extending portion 84 which terminates at its upstream end in a radially outwardly extending shoulder portion 86 in the same manner that the housing section 34 of the valve mechanism 10 terminates in the portion 36. The shoulder portion 86 is adapted to be compressed, along with the O-ring portion 44a of the member 38a, between the housing portion 74 and housing section 20a upon assembly of the housing members 16a and 70, as was described in connection with the valve mechanism 10. The downstream end of the valve seat section 82 is formed with a radially inwardly extending section 88 which defines a valve seat 90 that is for all purposes identical to the aforedescribed valve seat portion 88 and is adapted to cooperate with the valve portion 54a of the diaphragm member 38a in the same manner as the corresponding parts of the valve mechanism 10. The central portion of the valve seat section 80 defines a central aperture 92, around which a frusto conical valve seat 94 is formed. As will be apparent, the valve seat 94 is adapted to cooperate with the valve portion 60a of the diaphragm member 38a in the same manner as the corresponding parts of the valve 10. It will be seen, therefore, that the valve mechanism 10a is substantially the same in construction and will function almost identically to the aforedescribed valve 10, the only difference between the valve mechanisms 10 and 10a being the provision of the valve seat member 82 and two downstream outlets on the mechanism 10a. It may be noted that for certain vacuum systems, more than one vacuum inlet may be provided on the upstream members 16 or 16a, with the result that the valve mechanism of the present invention may be used to accommodate virtually all types of vacuum systems.

Due to the similarity in construction of the valve mechanisms 10 and 10a, the operation of the present invention will be hereinafter described with reference made only to the valve mechanism 10 shown in FIGURES 1, 2 and 4.

Assuming that the upstream member 16 is connected to a suitable source of vacuum and that the downstream member 18 is connected to a vacuum reservoir, tank or the like, whenever the vacuum level at the source is greater than the vacuum level in the reservoir, the valve section 52 of the diaphragm member 38 will move from the solid line position in FIGURE 1 toward the dotted line position in this figure, such movement being possible through the hinge means provided by the diaphragm section 46. Accordingly, during these conditions, the valve portions 54 and 60 will be disengaged from the valve seats 58 and 66, respectively, so that the vacuum conditions at the source may be communicated through the housing section 22, chamber 14, ports 48 and housing section 30 to the vacuum reservoir.

At such time as the vacuum level within the reservoir exceeds the vacuum level at the source as, for example, when the vehicle engine stops operating, so that a check valve action is necessary to prevent dissipation of vacuum from the reservoir, the valve section 52 will move toward the downstream end of the valve mechanism 10, with the result that the valve portions 54 and 60 will sequentially engage the valve seats 58 and 66, respectively. More particularly, during such conditions as the vacuum level in the reservoir exceeds that of the source, valve portion 60 immediately moves from the dotted line position in FIGURE 1 toward the downstream end of the valve 10 into sealing engagement with the valve seat 66, such initial movement of the valve portion 60 being due to the fact that said portion 60 is somewhat smaller than the valve portion 54, the relative movement of the valve portion 60 with respect to the valve portion 54 being possible through the hinge means provided the diaphragm section 62. By virtue of the fact that said hinging means is relatively flexible, the slightest differential pressure across the diaphragm member 38 will result in the valve portion 60 moving into sealing engagement with the valve seat 66. At a preselected time after the portion 60 begins to move toward the valve seat 66, the valve portion 54 will begin to move toward the downstream end of the valve 10 and thereafter sealingly engage the valve seat 58. The valve portion 54, therefore, will cooperate with the valve portion 60 in providing a positive seal between the upstream and downstream ends of the valve 10. It will be seen that the provision of the double sealing surfaces of the valve portions 54 and 60 enhances the sealing characteristics of the valve 10, and that there is no loss in sensitivity because of the differential sequential movement of the valve portions 60 and 54. Accordingly, the present invention provides a valve mechanism which is extremely sensitive to differential pressure changes and at the same time provides for a positive fluid seal to prevent any vacuum dissipation from the associated vacuum reservoir.

While it will be apparent that the exemplary embodiment illustrated herein is well calculated to fulfill the objects above stated, it will be appreciated that vacuum check valve of the present invention is susceptible to modification, variation and change without departing from the proper scope or fair meaning of the subjoined claims.

I claim:
1. In a vacuum check valve mechanism:
   an external housing defining a valve chamber and first and second passage means communicable with said chamber,
   means in said valve chamber defining a first generally frusto-conical valve seat and a second generally flat valve seat disposed coaxially of said first valve seat, and
   a valve member disposed within said valve chamber between said passages,
   said valve member having a peripheral portion secured to said housing, a valve section having first and second valve portions respectively engageable with said first and second valve seats, means supporting said valve section whereby said valve portions are movable toward and away from their respective valve seats, and means permitting relative movement between said first and second valve portions,
   said first valve portion being generally semi-spherical in shape and said second valve portion being generally flat,
   one of said valve portions being somewhat smaller in size than the other of said valve portions, whereby when a preselected differential pressure condition exists across said valve member, the smaller of said valve portions initially moves into engagement with its associated valve seat to provide at least a partial seal between said passages, and thereafter the larger of said valve portions moves into engagement with its associated valve seat to supplement the sealing action of said smaller valve portion and cooperate therewith in providing a substantially complete seal between said passages.
2. The invention as set forth in claim 1 wherein the smaller of said valve portions comprises said first semi-spherical valve portion and the larger of said valve portions comprises said second generally flat valve portion.
3. The invention as set forth in claim 1 wherein said means permitting relative movement between said first and second valve portions comprises a relatively flexible resilient portion interjacent said valve portions.
4. The invention as set forth in claim 3 which further includes a hinge portion formed integrally of said valve member between said peripheral portion and said second valve portion to permit relative movement of the entire valve section relative to said peripheral portion of said valve member.
5. The invention as set forth in claim 1 wherein said valve member is of a generally circular configuration, wherein said smaller valve portion comprises said first semi-spherical valve portion, wherein said larger valve portion comprises said second generally flat valve portion which extends around said first valve portion, which includes a first reduced thickness portion interjacent said first and second valve portions providing a hinge means whereby said first and second valve portions are individually movable toward and away from their respective valve seats, and which includes a second reduced thickness portion disposed between said peripheral portion and said second valve portion providing a hinge means whereby the entire valve section is movable toward and away from said valve seats relative to said peripheral portion.

References Cited

UNITED STATES PATENTS

| | | | |
|---|---|---|---|
| 2,370,451 | 2/1945 | Dank | 137—525.3 |
| 2,604,297 | 7/1952 | Winstead | 137—525.1 XR |
| 2,705,608 | 4/1955 | Phillips | 251—61.1 XR |
| 3,011,758 | 12/1961 | McFarland | 251—368 XR |
| 3,022,039 | 2/1962 | Cone | 251—210 |
| 3,084,707 | 4/1963 | Frye | 137—516.27 |
| 3,139,898 | 7/1964 | Wiltgen | 251—368 XR |

WILLIAM F. O'DEA, Primary Examiner

W. H. WRIGHT, Assistant Examiner

U.S. Cl. X.R.

137—61.1, 512.15, 525.3, 494